United States Patent [19]

Dieter, Jr. et al.

[11] 4,320,492

[45] Mar. 16, 1982

[54] VARIABLE WEIGHT PHONOGRAPH CARTRIDGE

[75] Inventors: Norman H. Dieter, Jr., Pleasantville; Sanford Drelinger, White Plains, both of N.Y.

[73] Assignee: Micro-Acoustics Corporation, Elmsford, N.Y.

[21] Appl. No.: 136,319

[22] Filed: Apr. 1, 1980

[51] Int. Cl.³ .............................................. G11B 3/16
[52] U.S. Cl. ..................................... 369/170; 369/247; 369/254
[58] Field of Search ............... 369/170, 171, 172, 247, 369/254

[56] References Cited

U.S. PATENT DOCUMENTS

| 1,992,893 | 2/1935 | Thomas | 369/254 |
| 3,334,904 | 8/1967 | Halnes | 369/171 |
| 3,523,690 | 8/1970 | Vande Koppel | 369/171 |
| 3,646,279 | 2/1972 | Stanton | 369/172 |
| 4,185,835 | 1/1980 | Robertson-Aikman | 369/254 |

Primary Examiner—John W. Shepperd
Attorney, Agent, or Firm—Kenyon & Kenyon

[57] ABSTRACT

To provide for adjustment of stylus tracking force appropriate to a particular tone arm with which a phonograph cartridge may be used, the cartridge is provided with a compartment into which one or more weights may be placed. A damper is included for preventing vibration of the weights.

11 Claims, 7 Drawing Figures

U.S. Patent  Mar. 16, 1982  Sheet 2 of 2  4,320,492
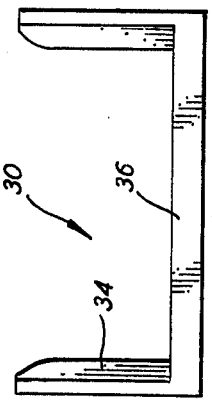
FIG. 5
FIG. 6
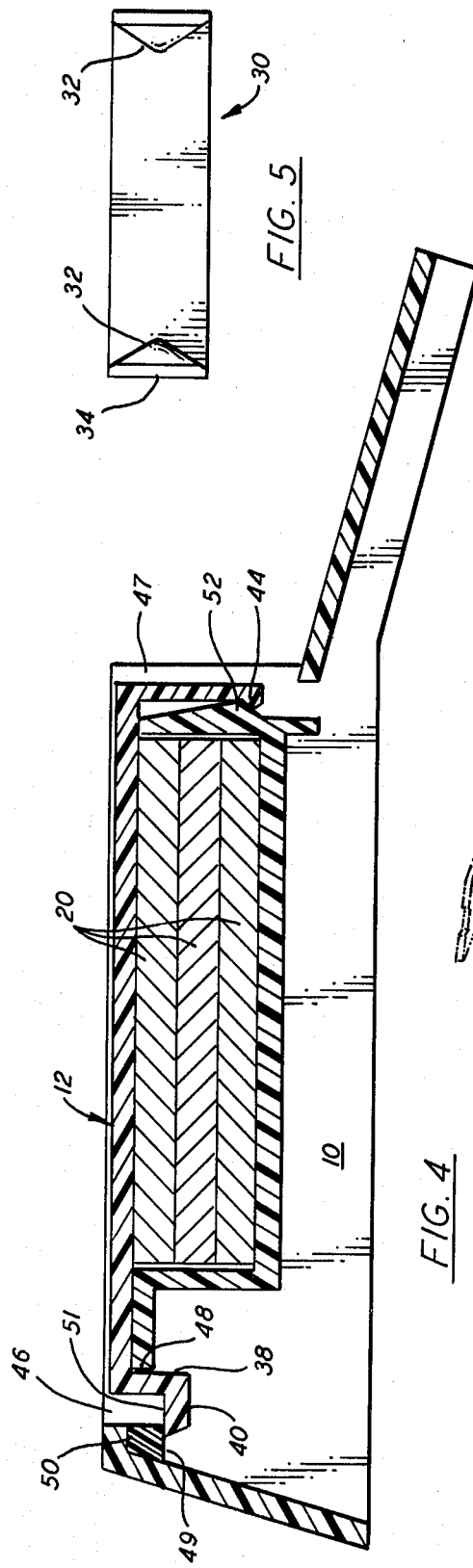
FIG. 4
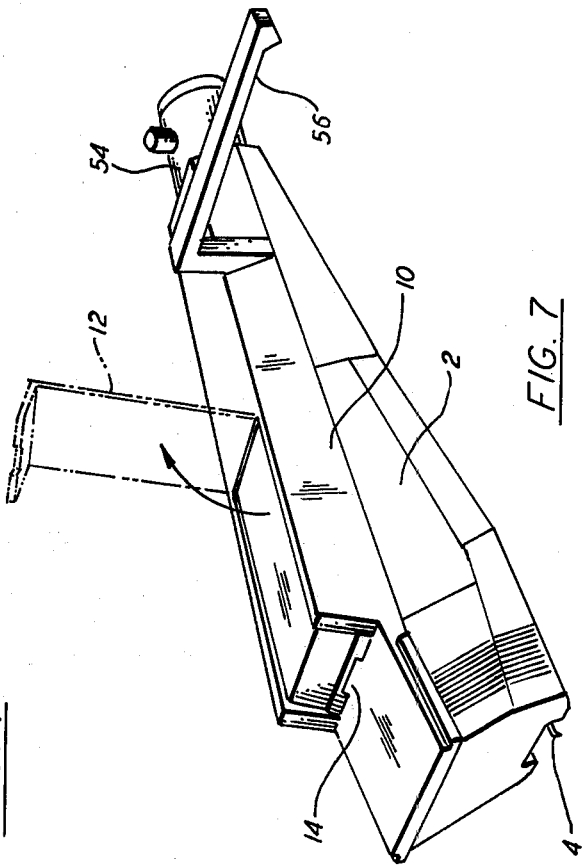
FIG. 7

VARIABLE WEIGHT PHONOGRAPH CARTRIDGE

BACKGROUND OF THE INVENTION

Field of the Invention

This invention relates to phonograph pickup heads. More particularly it relates to pickup heads for electric phonographs in which provision is made for varying the weight of the head.

It is well known that, during playback, a phonograph cartridge and its supporting tone arm rise and fall in response to a warped record. This results in generation of a signal, at the cartridge output which varies cyclically at a frequency, related to the cycle of undulation, and falling primarily in a range below 10 to 12 Hz. To minimize generation of this signal, and thus avoid its playback through the reproducing system, it is customary to provide the tone arm with a mechanical resonance between the natural compliance of the cartridge and the total mass of both cartridge and tone arm, both being referred to the stylus position, the frequency of which occurs in the range of 10 to 12 Hz. Then, at frequencies below the resonance frequency, the effect of the undulations is damped and the cartridge output is desirably reduced to zero, eliminating the undesirable "warp" signals.

Tests, using typical cartridge-tone arm systems for playback of warped records, show that warp-induced motion can result in inertial forces, due to cartridge-arm mass, of up to 0.5 grams; these forces react vertically at the stylus of the cartridge. In high quality equipment where vertical stylus forces of one gram are adequate, with flat records, to produce satisfactory tracking of the tone arm, it is necessary, when warp motion is present, to increase the vertical stylus force 50% to 1.5 grams to prevent mistracking of groove signal modulations.

It is well known in the art that, to minimize record and stylus wear, the vertical stylus force should be as small as possible. The stylus force required to prevent mistracking due to the inertial forces of warp motion can be reduced by reducing the cartridge-tone arm mass. It follows that it is desirable to have a minimum cartridge-tone arm mass, as referred to the stylus position, and that adjustment of cartridge mass is the most effective and direct method of gaining this end.

A survey of tone arms now in general use for carrying playback cartridges reveals that effective arm masses (referred to stylus position) range from 5 to 8 grams, for more recent designs, and from 8 to 16 grams, for older designs, excluding cartridge mass. Also, counter-balance in these designs is such that zero cartridge weight is required to compensate for proper vertical stylus force in the more recent designs, where 0 to 4 gram cartridge weights were required in the older designs.

The study also revealed that, for arms with effective mass values of from 5 to 8 grams, a cartridge having appropriate compliance and a weight of 2.5 grams would provide mechanical arm resonance at a frequency in the range of 10 to 12 Hz. To satisfy weight requirements for proper counter-balancing, it was found that the cartridge weight must vary from 2.5 to 4.0 grams.

SUMMARY OF THE INVENTION

The present invention solves the problem outlined above in a phonograph cartridge having a compartment into which a number of discrete weights can be put, as required, to adjust the cartridge weight to the optimum performance condition for a selected, existing tone arm. The cartridge includes a snap-fastened, hinged cover which provides convenient access to the weight compartment. In one embodiment, the cover is securely fastened in the closed position when the cartridge is mounted in the arm. Elastomeric damping is provided in the weight containing compartment to limit motion of any weight and to absorb any vibration of such weight.

BRIEF DESCRIPTION OF THE DRAWINGS

FIG. 4 is a partial view, in cross section, of the cover bracket of FIG. 3, with weights in place;

FIGS. 5 and 6 are top and side views of the weight grip used for stabilizing weights in the compartment; and FIG. 7 is a perspective view of the invention as applied to a cartridge which forms part of an integrated cartridge-head shell.

DETAILED DESCRIPTION OF THE INVENTION

Figure 1:
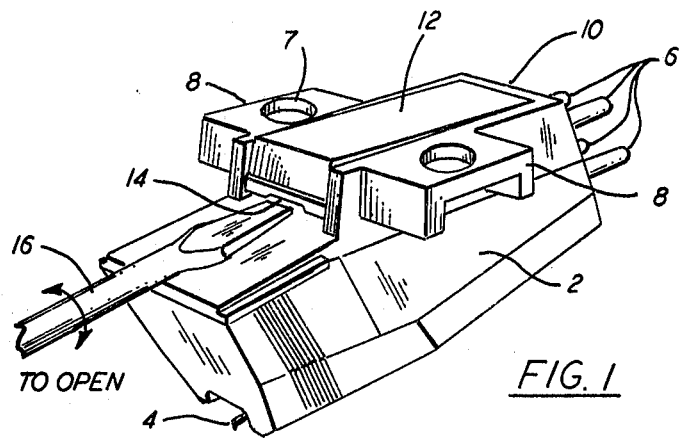
FIG. 1 is a perspective view of a cartridge, without a tone arm, which incorporates the teachings of the invention.

FIG. 1 is a perspective view of a cartridge assembly, fabricated in accordance with the teachings of the invention. The cartridge has a body 2 which contains a transducer for translating the motion of a pick-up needle 4 into output voltages, transmitted via connecting pins 6 for amplification in the two channels of a stereophonic sound system. It will be understood by those skilled in the art that the transducer driven by needle 4 may be of a magnetic or a crystal type which generates one or more voltages in response to oscillations in the groove of a phonograph disk being rotated underneath the cartridge in a conventional record player. The cartridge may be anchored in place in the shell of at one arm by means of screws passing through holes 7 in laterally projecting arms 8 on cover bracket 10. A movable weight cover 12 is pivotably mounted in cover bracket 10, and, as may be seen in FIG. 1, is provided with a cut-out 14 into which screwdriver 16 may be fitted for the purpose of raising the free end of weight cover 12 and providing access to the space inside.

Figure 2:
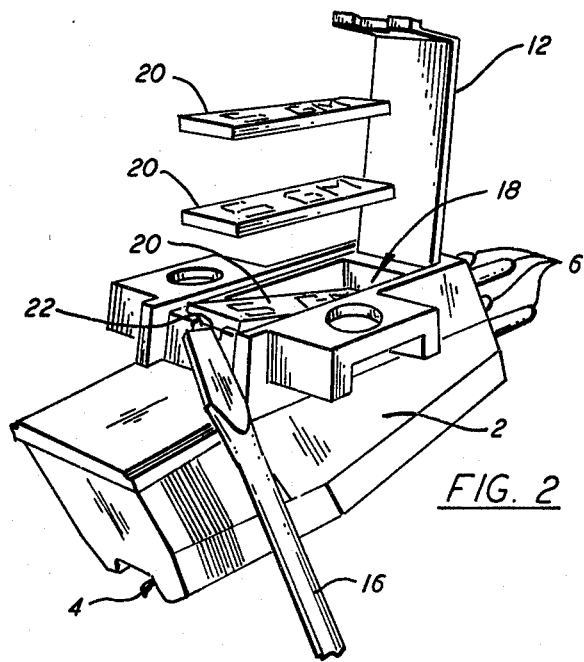
FIG. 2 is a view in perspective, like that of FIG. 1, but showing the hinged cover in the open position and receiving three weights.

The same cartridge is shown in FIG. 2, from the same point of view, but with weight cover 12 fully raised to permit access to the weight compartment 18. Three 0.5 gram, rectangular, plate-like weights 20 are shown, spaced apart, above the floor of weight compartment 18. Screwdriver 16 is used for raising the weights, gaining access to them through a vertical, frontal cut-out 22.

Figure 3:
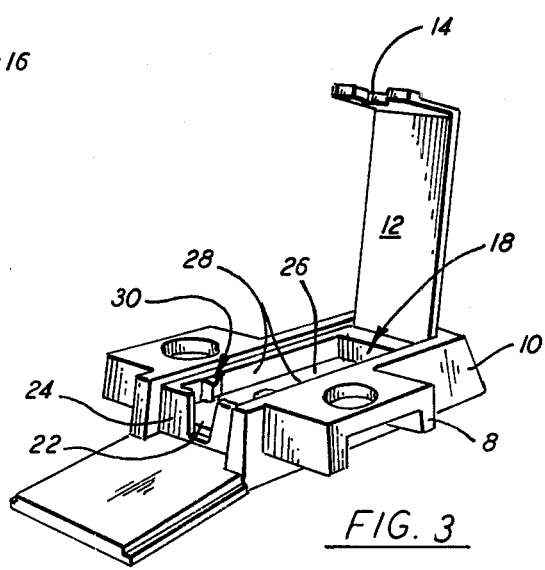
FIG. 3 is a perspective view of the cover bracket portion of the cartridge of FIGS. 1 and 2, showing details of the weight-containing compartment.

The construction of weight compartment 18 may best be seen in FIG. 3 where the cover bracket portion of the cartridge assembly is shown by itself. As before, cover 12 is shown in the fully opened position. There it can be seen that the interior of the weight compartment is generally rectangular in shape, having a vertical slot 22 in front face 24, having a bottom 26 for supporting the weights, and also having, recessed in its opposite, generally parallel sides 28, a weight grip 30 from which obtusely angled projecting surfaces 32 extend into the weight containing space from either side thereof.

The construction of weight grip 30 is best seen in FIGS. 5 and 6. In the top view of FIG. 5 the generally triangular nature of the inwardly projecting surfaces 32 of weight grip 30 can be seen. Seen from the side, weight grip 32 includes a transverse portion 36 on which vertical arms 34 are integrally formed. Wedge shaped surfaces 32 are formed on arms 34 and engage opposite edges of each weight 20 in the compartment. This assembly, which may be made of butyl rubber, is designed so that the surfaces 32 press against opposite edges of each weight 20 to stabilize it and absorb any vibration. While butyl rubber is a preferred material for constructing the invention, it will be apparent to those skilled in the art that another resilient material such as plastic, can serve this purpose.

A view in cross-section of the cover bracket of FIGS. 1–3 is shown in FIG. 4. There it can be seen that cover bracket 10 is a hollow shell; the shell may be formed of a molded plastic such as ABS. In this illustrated embodiment, weight containing space 18 is shown as containing three weights 20. In the view of FIG. 4, transverse portion 36 of weight grip 30 is shown, in cross-section, in a recess in floor 26 of weight containing space 18. Space 18 is closed by weight cover 10 which is made of a polycarbonate plastic having very high tensile strength and a flexural stiffness appropriate for this use. Weight cover 10 has, at one end, an integral dogleg with right-angled midsection 38 and right-angled outer section 40 extending away from, and parallel to, the center portion of the cover plate. The opposite end of weight cover 10 has another right angled section 42 on the end of which is formed a boss or detent projection 44, which extends towards the dogleg. The dogleg end of weight cover 10 fits through a preformed slot 46 in the upper surface of cover bracket 10 and the right angled midsection 38 comes to rest, when the weight cover is closed, against the side 48 of slot 46 which lies nearest to weight containing space 18. As shown, a trapezoidal weight cover lock bar 50 is fastened in the left hand upper corner of cover bracket 10, being held there by gluing, for example. The lower face 49 of block bar 50 presses against the upward facing surface 51 of outer section 40 of cover plate 12. Bar lock 50 is fastened in place after the insertion of weight cover 12 in slot 46 at the time of manufacture and acts, together with side 48 of slot 46 to prevent motion of weight cover 12 out of slot 46 when it is open.

Detent boss 44 on opposite right-angled arm 42 of weight cover 12, engages a mating projection (or projections) 52 on the outer surface of slotted end wall 24 of weight containing space 18. Cover 12 is so dimensioned that, when it is closed, the length of the cover is placed under tension and boss 44 and projection 52 cooperates to provide an over-center snap action.

FIG. 7 illustrates the way in which the teachings of the invention may be applied to an adjustable weight structure in an integrated cartridge and head shell design. Such structures may be used for more or less permanent attachment of a cartridge to a tone arm. The basic structure remains the same, with cover bracket 10 having weight cover 12, which opens upward out of the top of the shell. Cover bracket 10 is fastened to cartridge containing boss 2, and pickup needle 4 projects downward out of housing 2. This assembly is attachable to a tone arm by means of axially projecting cylindrical sleeve 54, and a laterally projecting arm 56 is formed integrally with the cover bracket 10 and serves as a handle for moving the pickup. Since, this construction provides continuous access to the weights under cover 12, it has the advantage that weight changes can be made after assembly of the cartridge into the operating structure. The phonograph user is thus able to vary the vertical stylus force in response to changing circumstances without disassembling the cartridge.

The invention has been described above in a particular form calling, for example, for providing variation of the cartridge weight acting at the stylus over a specified range of 2.5 to 4.0 grams and in specific increments of 0.5 grams. It is to be understood that application of the teachings of the invention can encompass many other structural arrangements. Accordingly, the below appended claims are to be given as interpretation in keeping with the spirit of the invention, rather than limited to the specific embodiments described herein.

What is claimed is:

1. In a phonograph cartridge having a transducer and an enclosure, the improvement comprising:
   the enclosure having a compartment for receiving a number of weights; and
   a grip in the compartment for retaining each weight.

2. A phonograph cartridge in accordance with claim 1 further comprising the compartment being adapted to receive a number of rectangular, plate-like weights; and
   the weight grip comprising an elastomer adapted to contact each weight.

3. In a phonograph cartridge in accordance with claim 2, the further improvement comprising the weight grip being made of butyl rubber and having surfaces adapted to press against opposite sides of each weight.

4. In a phonograph cartridge in accordance with claim 3, the further improvement comprising the weight pressing surfaces of the grip each having an obtuse profile, forming a ridge.

5. In the phonograph cartridge according to claim 1, the further improvement comprising: a cover for closing the compartment.

6. In a phonograph cartridge in accordance with claim 2, the further improvement comprising the cover for the weight compartment having an over-center snap closure.

7. In a phonograph cartridge in accordance with claim 5, the further improvement comprising:
   the weight cover being hinged and having a point of purchase where pressure may be applied for opening the cover.

8. In a phonograph cartridge in accordance with claim 5, the further improvement comprising:
   the compartment having an opening and a wall on either side of the opening;
   a surface projecting laterally from a wall of the container near the opening;
   a slot in the surface;
   a boss on the opposite wall of the container projecting in a direction opposite from that of the surface;
   a cover including a plastic surface extending across the opening of the container and having first and second arms depending adjacent to, and outwards of, the opposite walls; and
   the first arm extending into the slot and the second arm having a raised portion facing the container and adapted to snap-fit over the boss.

9. The container of claim 8 further comprising:
a weight cover lock fastened under the outermost portion of the surface and adjacent to the slot; and
the first arm having an outward projecting member for contacting the weight cover lock when the cover is fastened and for preventing removal of the cover when it is opened.

10. In a phonograph cartridge in accordance with any one of claims 1 to 6, the further improvement comprising:
the cartridge enclosure including a cover bracket adapted for mounting in a head shell and for preventing access to the weight cover thereby.

11. In a phonograph cartridge in accordance with any one of claims 1, 2 or 5, the further improvement comprising:
the weight receiving compartment having inner walls substantially conforming to the outline of the weights, and an opening in a wall of the compartment providing access to the weights by a tool.

* * * * *